United States Patent
Hasegawa et al.

(10) Patent No.: US 6,831,627 B2
(45) Date of Patent: Dec. 14, 2004

(54) DRIVING METHOD FOR LIQUID CRYSTAL DISPLAY

(75) Inventors: Fumio Hasegawa, Tokyo (JP); Makoto Aoki, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 53 days.

(21) Appl. No.: 09/826,252

(22) Filed: Apr. 4, 2001

(65) Prior Publication Data

US 2001/0028335 A1 Oct. 11, 2001

(30) Foreign Application Priority Data

Apr. 7, 2000 (JP) ........................................ 2000-107245

(51) Int. Cl.[7] ................................................ G09G 3/36
(52) U.S. Cl. .......................... 345/102; 345/76; 345/87; 345/67; 345/36; 345/50; 345/88
(58) Field of Search .............................. 345/76, 87, 67, 345/36, 50, 102

(56) References Cited

U.S. PATENT DOCUMENTS 4,581,654 A * 4/1986 Kobayashi et al. ......... 358/230

6,061,041 A * 5/2000 Yoshida ........................ 345/76
6,437,769 B1 * 8/2002 Kobayashi et al. .......... 345/102

FOREIGN PATENT DOCUMENTS

JP       59-97191     6/1984    ............ G09G/3/20
JP       11-249135  * 9/1999    ......... G02F/1/1335

* cited by examiner

Primary Examiner—Matthew C. Bella
Assistant Examiner—Tam Tran
(74) Attorney, Agent, or Firm—Hayes Soloway P.C.

(57) ABSTRACT

A liquid crystal display includes an electro-luminescence portion which has electro-luminescence elements and a liquid crystal portion which has liquid crystal layer, scanning electrodes and signal electrodes and controls the transmittance of light emitted by the electro-luminescence elements. First, scanning pulses are applied in sequence to the scanning electrodes. Next, a gradation signal are applied associated with image data to the signal electrodes. Then, the electro-luminescence portion is allowed to emit light of a plurality of colors at the same time in pixels after transmissivity of the liquid crystal layers in the pixels reaches a predetermined value. The pixels are located at the intersections between a scanning electrode to which the scanning pulse is applied and the signal electrodes to which the gradation signal is applied.

5 Claims, 8 Drawing Sheets

DRIVING METHOD FOR LIQUID CRYSTAL DISPLAY

BACKGROUND OF THE INVENTION

1. Field of the Invention

The present invention relates to a driving method for a liquid crystal display which is suitable for a thin display, in particular, to a driving method for a liquid crystal display wherein deterioration of the image quality, such as unclearness of an outline and blurring of colors when displaying a moving image, is prevented so as to increase an image quality and a luminance.

2. Description of the Related Art

A liquid crystal display is provided with two sheets of glass substrate and a liquid crystal layer placed between them. In general, in a thin film transistor (TFT) type panel, color filters for three colors (red, green and blue) are formed on the glass substrate on the side opposite to the TFT side glass substrate where TFTs are provided. FIG. 1 is a cross section view showing a structure of a liquid crystal display according to a prior art. FIG. 2 is a block diagram showing a structure of the liquid crystal display according to the prior art.

In the liquid crystal display according to the prior art, a TFT portion 102 is provided on the surface of a glass substrate 101. The TFT portion 102 is provided with a plurality of scanning electrodes (not shown) arranged parallel to each other, a plurality of signal electrodes arranged so as to cross those scanning electrodes, and TFTs as switching elements arranged at intersections between the scanning electrodes and the signal electrodes. Accordingly, the TFTs are arranged in a matrix form. On the other hand, a polarizing plate 103 is attached to the back surface of the glass substrate 101. Here, the scanning electrodes extend in the horizontal direction while the signal electrodes extend in the vertical direction.

In addition, a glass substrate 104 is provided in parallel with the glass substrate 101, with a proper space between them, on the side of the TFT portion 102 of the glass substrate 101. A common electrode layer 105 made of a transparent conductive material and color filters 106 are provided on the surface of the glass substrate 104 opposite to the glass substrate 101. As for the color filters 106, three color types of filters, that is to say, red filters 106R, green filters 106G, and blue filters 106B, which extend in the vertical direction are provided and are arranged so as to repeat, in order, in the horizontal direction. The color filters 106 are formed by applying pigments or dyes. Here, each pitch of the filters 106R, 106G and 106B coincides with the pitch of the signal electrodes. On the other hand, a polarizing plate 107 is attached to the back surface of the glass substrate 104 to the surface opposite to the glass substrate 101.

Then, the glass substrate 101, the glass substrate 104 and the like, are integrated so as to provide a liquid crystal layer 108 by injecting a liquid crystal material between them. In this manner, an active matrix type liquid crystal display panel (LCD panel) 110 is configured.

In addition, a light source 109 and a light guide plate 111, which guides light emitted from this light source 109 so that it enters the liquid crystal display panel 110 in the vertical direction, are provided on the back surface of the glass substrate 101. A reflecting sheet, a diffusion plate (not shown) and the like are provided between the light guide plate 111 and the LCD panel 110. Then, a backlight is formed of the light source 109, the light guide plate 111 and the like. As for the light source 109, mainly a cathode ray tube fluorescent lamp is utilized.

In addition, a scanning circuit 131, which drives n scanning electrodes G1 to Gn, and a holding circuit 132, which drives (m×3) signal electrodes, in total, DR1 to DRm, DG1 to DGm and DB1 to DBm are provided in the liquid crystal display panel 110. In addition, a signal processing portion 133 which processes image data and outputs the result to the scanning circuit 131 and the holding circuit 132 is provided. Moreover, a source for gradation 134 is provided which supplies voltage for the gradation display, to the holding circuit 132, associated with the output signal of the signal processing portion 133. Signals outputted from the signal processing portion 133 to the scanning circuit 131 are a clock signal and a start signal.

Next, a driving method for the liquid crystal display according to the prior art, which is configured as described above, is described. FIG. 3 is a graph diagram showing the relationship between time, which is taken along the horizontal axis, and luminance, which is taken along the vertical axis, in the liquid crystal display according to the prior art. In FIG. 3, the two-dotted broken line shows luminance set for one pixel and the solid line shows the actual luminance for the one pixel.

In the driving method according to the prior art, scanning pulses are applied in sequence from the scanning electrode G1 to the scanning electrode Gn by the scanning circuit 131 with reference to the start pulse $V_{SP}$ and the clock signal $V_{CLK}$. Together with this, a voltage for gradation display is applied to the signal electrodes DR1 to DRm, DG1 to DGm and DB1 to DBm by the holding circuit 132.

However, since there exists a response time for the voltage applied to the liquid crystal until the full rotation is achieved, the actual luminance (solid line) cannot reach the set value immediately but, rather, rises gradually even when the voltage for gaining luminance (two-dotted broken line) is applied to a signal electrode as shown in FIG. 3. In the case of scanning at 60 Hz, time required for the scanning of one frame is approximately 16.7 milliseconds while a response time of a twisted nematic (TN) type liquid crystal is approximately 15 milliseconds.

In addition, the backlight 109 is turned on at all times. Therefore, light of the three colors of red, green and blue is emitted from the liquid crystal display panel 110 simultaneously in accordance with the extent of the rotation of the liquid crystal.

In addition, the development of an organic electro-luminescence (EL) display as a thin type display is also progressing. FIG. 4 is a schematic cross section view showing an EL element and its luminous principle and FIG. 5 is a block diagram showing the structure of an organic EL display according to a prior art.

The EL element is configured as follows. That is to say, a transparent indium tin oxide (ITO) electrode 122 is formed as a positive electrode on a transparent substrate 121 made of glass or film. In addition, on the ITO electrode 122, an organic positive hole injection layer 123 and an organic luminous layer 124 are deposited in sequence and, on top of that, a metal electrode 125 is formed as a negative electrode. Then, when a voltage is applied between the ITO electrode 122 and the metal electrode 125, light is emitted from the organic luminous layer 124 to the side of the transparent substrate 121.

The organic EL display is provided with a simple matrix system EL panel 120 where EL elements which are configured in the above manner are arranged in a matrix form. In addition, a row driving portion 135 which drives row electrodes R1 to RL, which the number is the same as that of the scanning lines, and a column driving circuit 136 which drives (m×3) column electrodes, in total, CR1 to CRm, CG1 to CGm and CB1 to CBm are provided. In the column driving circuit 136, a latch circuit, which maintains the voltage based on the signal from a signal processing portion and which outputs signals for the number of column electrodes at the same time, and a constant current circuit, which converts the voltage outputted from this latch circuit into a current so as to supply it to a column electrode, are provided. In the organic EL display, a signal processing portion 137 which processes image data and which outputs the result to the row driving portion 135 and the column driving circuit 136 is further provided. Signals outputted from the signal processing portion 137 to the row driving portion 135 are the start pulse $R_{SP}$ and the clock signal $R_{CLK}$.

Next, a driving method for the organic EL display, which is configured as described above, is described. FIG. 6 is a graph diagram showing the relationship between time, which is taken along the horizontal axis, and luminance, which is taken along the vertical axis, in the organic EL display according to the prior art. In FIG. 6, the two-dotted broken line shows luminance set for one pixel and the solid line shows the actual luminance in the one pixel.

In the driving method according to the prior art, scanning pulses are applied in sequence from the row electrode R1 to the row electrode Rn by the row driving portion 135 with reference to the start pulse $R_{SP}$ and the clock signal $R_{CLK}$. In addition, a current for the gradation display by the latch circuit within the column driving circuit 136 is applied to the column electrodes DR1 to DRm, DG1 to DGm and DB1 to DBm by synchronizing them with the risings of the scanning pulses. In addition, a negative bias is applied so that no current flows through the non-scanning row electrodes.

Since the response speed of an EL element is sufficiently fast in comparison with that of a liquid crystal, a display with a desired luminance is instantly carried out by supplying a current into the column electrode as shown in FIG. 6.

In the liquid crystal display according to the prior art as shown in FIG. 2, however, there is a problem of unclearness of the outline and blurring of colors caused when displaying a moving image as described above. In addition, there is also the problem of a limit to increasing thinness because of the existence of a backlight. Furthermore, luminance is lowered through loss due to the color filters because light is emitted via the color filters.

On the other hand, in the organic EL display according to the prior art as shown in FIG. 5, which is an impulse type, the response speed is fast and, therefore, there is no problem of unclearness of the outline or of blurring of colors when displaying a moving image. In the case where the number of scanning lines increases together with the high definition, however, the time for a scanning pulse being applied to one row electrode is reduced accordingly and, therefore, a problem arises that the luminous duty and luminance are lowered. In addition, the width of a row electrode becomes narrower because of the increase of the number of scanning lines and, therefore, the problem arises that the patterning becomes more difficult and the yield is lowered. Moreover, since a latch circuit is required for adjusting a current amount, which is supplied to a column electrode in accordance with the image data, the configuration of the column driving circuit is complicated.

Therefore, in order to eliminate these defects, a liquid crystal display wherein an EL panel is provided in the backlight portion has been proposed (Japanese Unexamined Patent Publication No. Sho 59-97191, Japanese Unexamined Patent Publication No. Hei 11-249135, and the like).

In those publications, displays gained by combining liquid crystal display panels and EL panels are described wherein liquid crystal panels are utilized as shutters for light emitted by EL elements. In particular, in the Japanese Unexamined Patent Publication No. Sho 59-97191, a driving method is described where EL elements are made to emit light after the transmittance in the liquid crystal is saturated. That is to say, the timing according to which a driving signal is supplied to the EL panel is delayed in comparison with the timing according to which a driving signal is supplied to the liquid crystal display panel. In this driving method, the emitting of light of three colors for forming one pixel is carried out by time-sharing. That is to say, light of three colors is emitted according to different timings.

However, this is intended to solve the problems in a liquid crystal display and, therefore, though problems particular to a liquid crystal display can be solved by simply combining a liquid crystal display panel and an EL panel, the problems particular to an organic EL display cannot be solved. For example, the problems such as a decrease of contrast and luminous duty, together with high definition as well as difficulty in patterning still remain. In addition, though in the case where the driving method described in the Japanese Unexamined Patent Publication No. Sho 59-97191 is applied, unclearness of the outline and the blurring of colors when displaying a moving image due to the existence of a response time in the liquid crystal can be prevented, the new problem emerges that the driving circuit and the like becomes complicated due to the necessity of a clock signal with a high frequency since light in three colors is emitted according to different timings on the EL panel.

SUMMARY OF THE INVENTION

It is an object of the present invention to provide a driving method for a liquid crystal display wherein deterioration of the image quality such as unclearness of the outline and the blurring of colors when displaying a moving image can be prevented and wherein a high luminance can be gained at the time of high definition.

According to the present invention, a driving method for a liquid crystal display which comprises an electro-luminescence portion which has electro-luminescence elements and a liquid crystal portion which has liquid crystal layer, scanning electrodes and signal electrodes and controls the transmittance of light emitted by the electro-luminescence elements, comprises the steps of applying scanning pulses in sequence to the scanning electrodes, applying a gradation signal associated with image data to the signal electrodes; and allowing the electro-luminescence portion to emit light of a plurality of colors at the same time in pixels after transmissivity of the liquid crystal layers in the pixels reaches a predetermined value. The pixels are located at the intersections between a scanning electrode to which the scanning pulse is applied and the signal electrodes to which the gradation signal is applied.

In the present invention, after the transmittance of the liquid crystal in a pixel, to which the scanning electrode that the scanning pulse is applied to is assigned, reaches a predetermined value, light of a plurality of colors is emitted in this pixel so that light of these plurality of colors is emitted at the same time and, therefore, it is possible for the frequency of the clock signal supplied to the EL panel to be reduced in comparison with the case where light of three colors is emitted by time-sharing according to a prior art. In addition, current adjustment for luminance adjustment becomes unnecessary. Therefore, it becomes possible to simplify the EL driving circuit and to secure, in a wide manner, the driving margin of the driving circuit. Moreover, since light emission time per color becomes longer, a high luminance can be gained. In addition, it is possible to prevent the unclearness of the outline, the blurring of colors and the like when displaying a moving image.

In the case where pixels included in neighboring rows are made to emit light at the same time, it becomes possible to secure a longer light emission time for one time. Therefore, even though the number of scanning lines has increased due to high definition, sufficient luminance can be gained. In addition, it becomes possible for light emitting elements to increase their longevity due to the decrease in the number of light emissions and the reduction of the load of the current.

In addition, in the case where electro-luminescence portion has row electrodes which overlap the scanning electrodes, the width of the row electrodes can be made broader so that the patterning in a process becomes easier and the yield increases. At this time, it is preferable that the number of scanning electrodes that overlap each of the row electrodes are constant so that the number of rows of pixels which are made to emit light at the same time is constant. By providing such a configuration, it becomes possible to make luminance uniform in accordance with the position within the screen. The number of scanning electrodes with which each of the row electrodes overlaps may be mutually different. The row electrodes are the electrodes for applying a voltage to a unit of a row, or a plurality of rows, of the electro-luminescence elements arranged in a matrix form in the electro-luminescence portion.

In addition, the electro-luminescence portion may comprise column electrodes for each color, and, in allowing the electro-luminescence portion to emit light, all of column electrodes for the same color may be driven at the same time. In the case of adopting such a driving method, a constant current source may be provided for column electrodes of each column so that the driving circuit is simplified. The column electrodes are the electrodes for applying a voltage to a unit of one column, that is to say a unit of one color, for electro-luminescence elements arranged in a matrix form in the electro-luminescence portion.

In addition, in allowing the electro-luminescence portion to emit light, all of the column electrodes, including column electrodes for different colors, may be driven at the same time. Since it is not necessary to adjust the timing of the application of a current, the driving circuit is simplified.

BRIEF DESCRIPTION OF THE DRAWINGS

FIG. 13 is a timing chart showing the shift of a variety of signals, or the like.

THE PREFERRED EMBODIMENTS OF THE INVENTION

Figure 1:
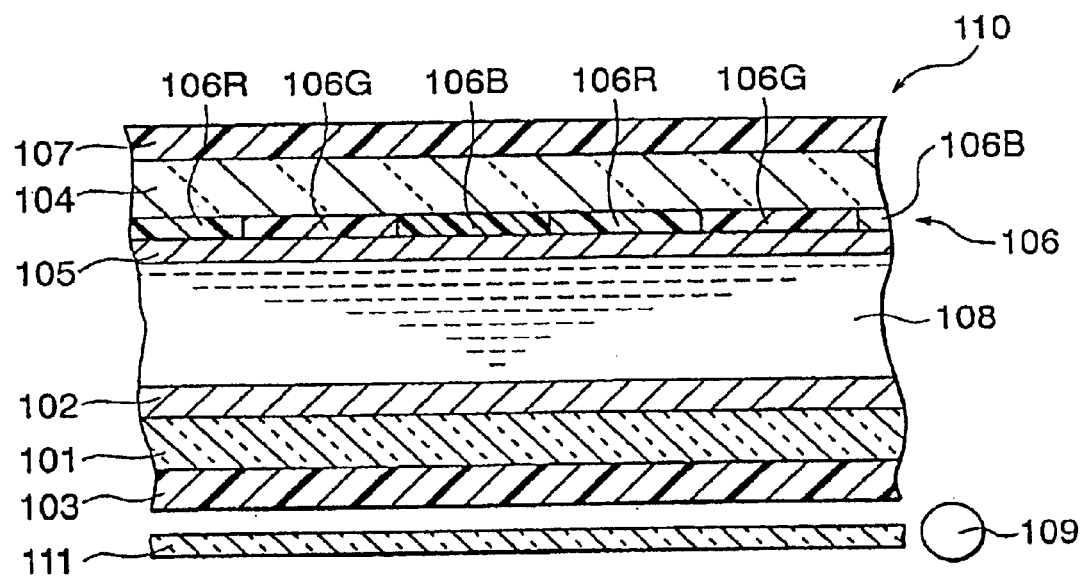
FIG. 1 is a cross section view showing a structure of a liquid crystal display according to a prior art.
Figure 2:
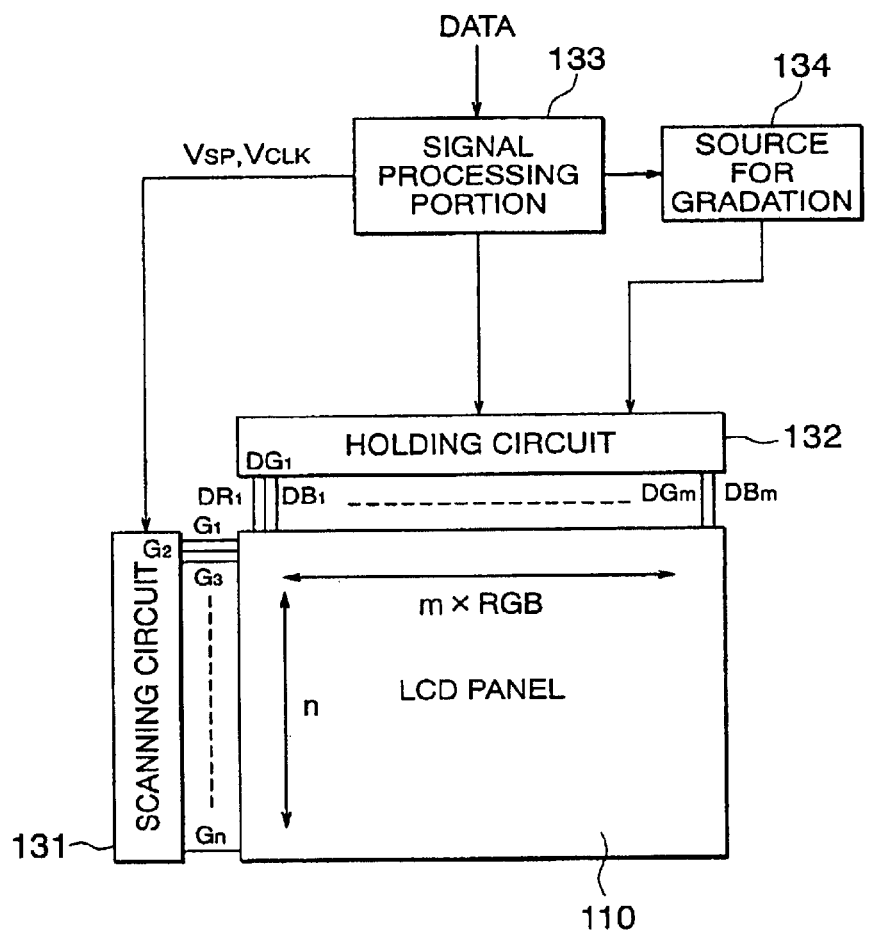
FIG. 2 is a block diagram showing a structure of the liquid crystal display according to the prior art.
Figure 3:
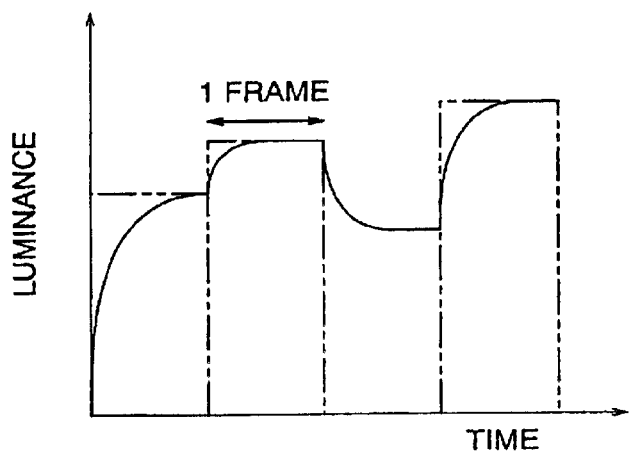
FIG. 3 is a graph diagram showing the relationship between time and luminance in the liquid crystal display according to the prior art.
Figure 4:
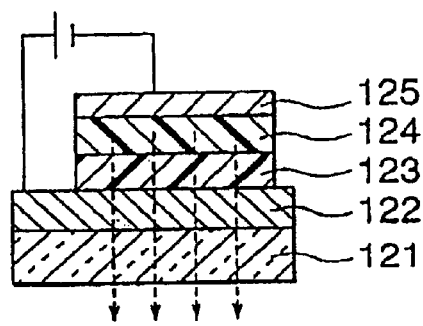
FIG. 4 is a schematic cross section view showing an EL element and its luminous principle.
Figure 5:
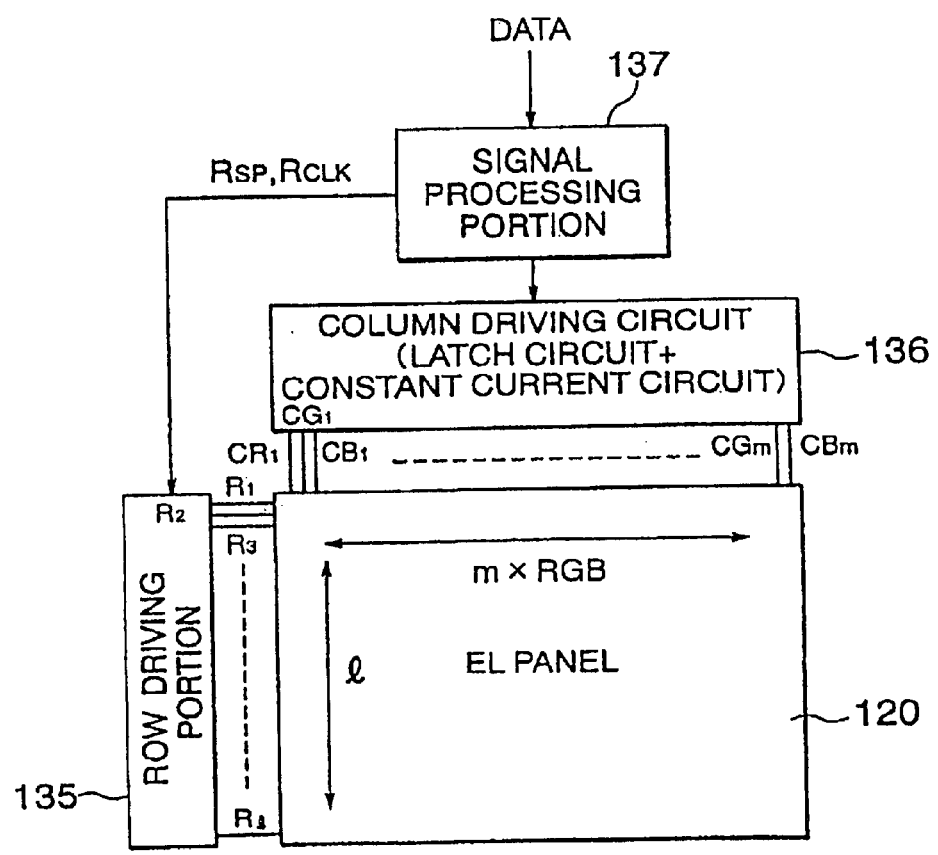
FIG. 5 is a block diagram showing a structure of an organic EL display according to a prior art.
Figure 6:
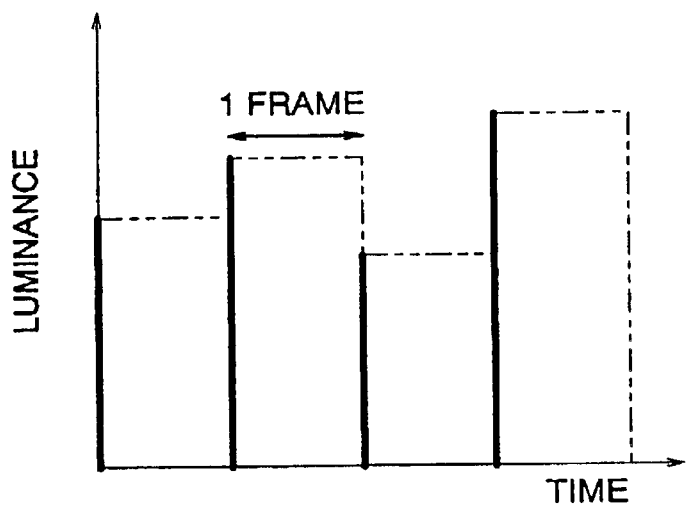
FIG. 6 is a graph diagram showing the relationship between time and luminance in the organic EL display according to the prior art.
Figure 7:
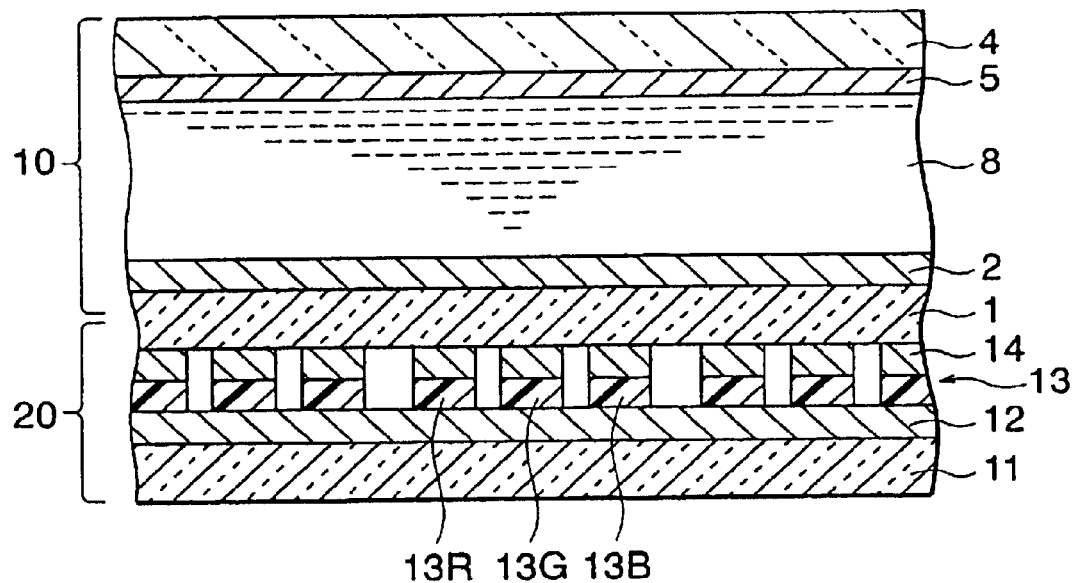
FIG. 7 is a cross section view showing a structure of a liquid crystal display utilized in an embodiment of the present invention.
Figure 8:
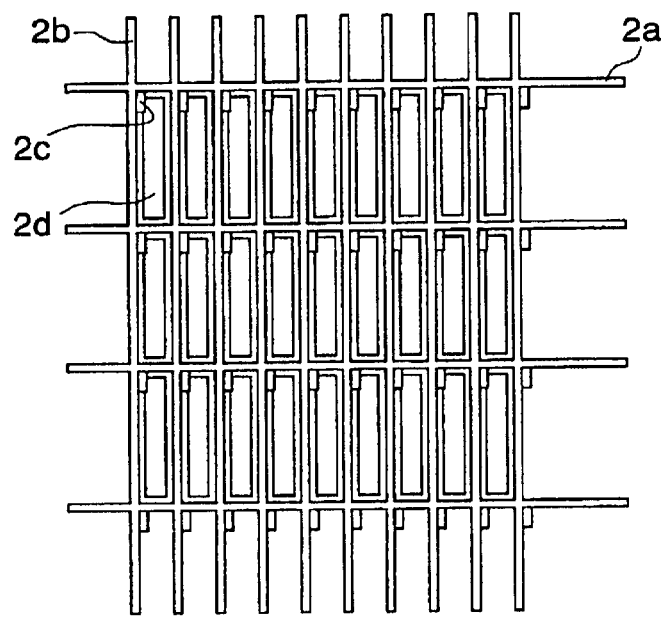
FIG. 8 is a schematic plan view showing electrode and TFT patterns in the TFT portion of the liquid crystal display panel.
Figure 9:
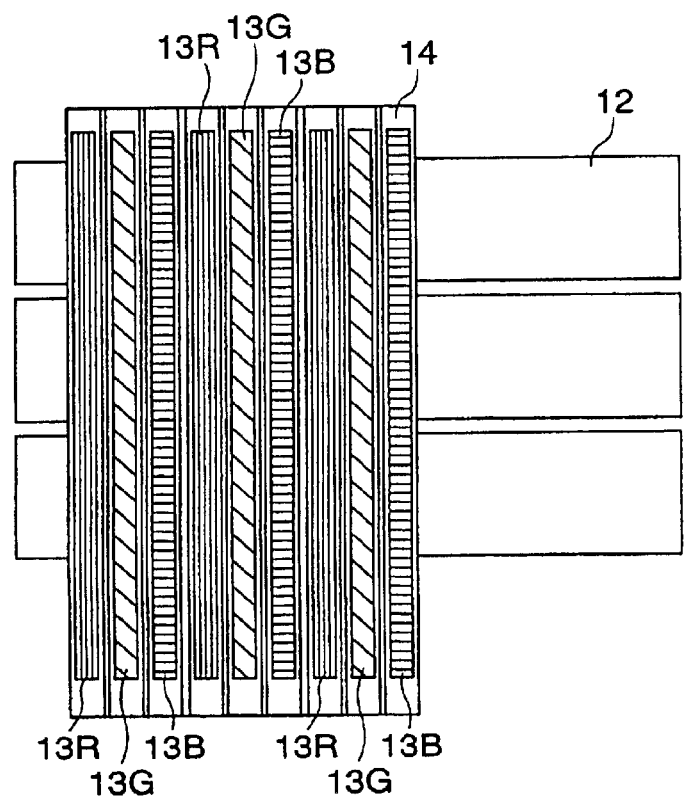
FIG. 9 is a schematic plan view showing electrode and EL patterns in the EL panel.

In the following, the embodiment of the present invention is concretely described in reference to the attached drawings. FIG. 7 is a cross section view showing a structure of a liquid crystal display utilized in the embodiment of the present invention. FIG. 8 is a schematic plan view showing electrode and TFT patterns in the TFT portion of the liquid crystal display panel, and FIG. 9 is a schematic plan view showing electrode and EL layer patterns in the EL panel.

The liquid crystal display utilized in the method according to the present embodiment is provided with an LCD panel 10 and an EL panel 20 as shown in FIG. 7.

In the LCD panel 10, a TFT portion 2 is provided on the surface of a glass substrate 1. The glass substrate 1 is, as described below, shared with the EL panel 20. The TFT portion 2 is, as shown in FIG. 8, provided with a plurality of scanning electrodes 2a which are arranged in parallel with each other and which extend in the horizontal direction, a plurality of signal electrodes 2b which are arranged so as to cross these scanning electrodes 2a and which extend in the vertical direction, and TFTs 2c as switching elements arranged at intersections between the scanning electrodes 2a and the signal electrodes 2b. Accordingly, the TFTs 2c are arranged in a matrix form. Here, the scanning electrodes 2a are connected to the gates of the TFTs 2c while the signal electrodes 2b are connected to the drains of the TFTs 2c. In addition, sub-pixel electrodes 2d, which are respectively connected to the sources of the TFTs 2c, are provided. The sub-pixel electrodes 2d are transparent electrodes formed of, for example, ITO.

In addition, a glass substrate 4 is provided in parallel with the glass substrate 1, with a proper space between them, on the side of the TFT portion 2 of the glass substrate 1. A common electrode layer 5 made of a transparent conductive material, such as ITO, is provided on the surface of the glass substrate 4 opposite to the glass substrate 1.

Then, the glass substrate 1, the glass substrate 4, and the like are integrated so as to form a liquid crystal layer 8 by injecting a liquid crystal material between them. In this manner, an active matrix type LCD panel 10 is configured.

On the other hand, in the EL panel 20, a plurality of row electrodes 12 which are arranged in parallel with each other and which extend in the horizontal direction are provided on the surface of a protective layer 11. The row electrodes 12 are, for example, made of metal. In addition, though the width thereof is, for example, equal to that of several tens of pixels, it is not limited to this but may be equal to that of one, two or several tens of pixels.

In addition, shown in FIG. 9, red light emitting EL layers 13R, green light emitting EL layers 13G and blue light emitting EL layers 13B which extend in the vertical direction on the row electrode 12 are formed. The red light emitting EL layers 13R, the green light emitting EL layers 13G, and the blue light emitting EL layers 13B are arranged, for example, in order starting from the left and light emitting EL layers 13 for three colors are provided for one pixel. Accordingly, the pitch of the light emitting EL layers 13 for each color may be the same as that of the signal electrodes 2b. In addition, a transparent column electrode 14 made of, for example, ITO is formed on each EL layer 13 and the column electrodes 14 are provided on the back surface of the glass substrate 1, the TFT portion 2 being not on the back surface. In this manner, a simple matrix type EL panel 20 is formed.

Figure 10:
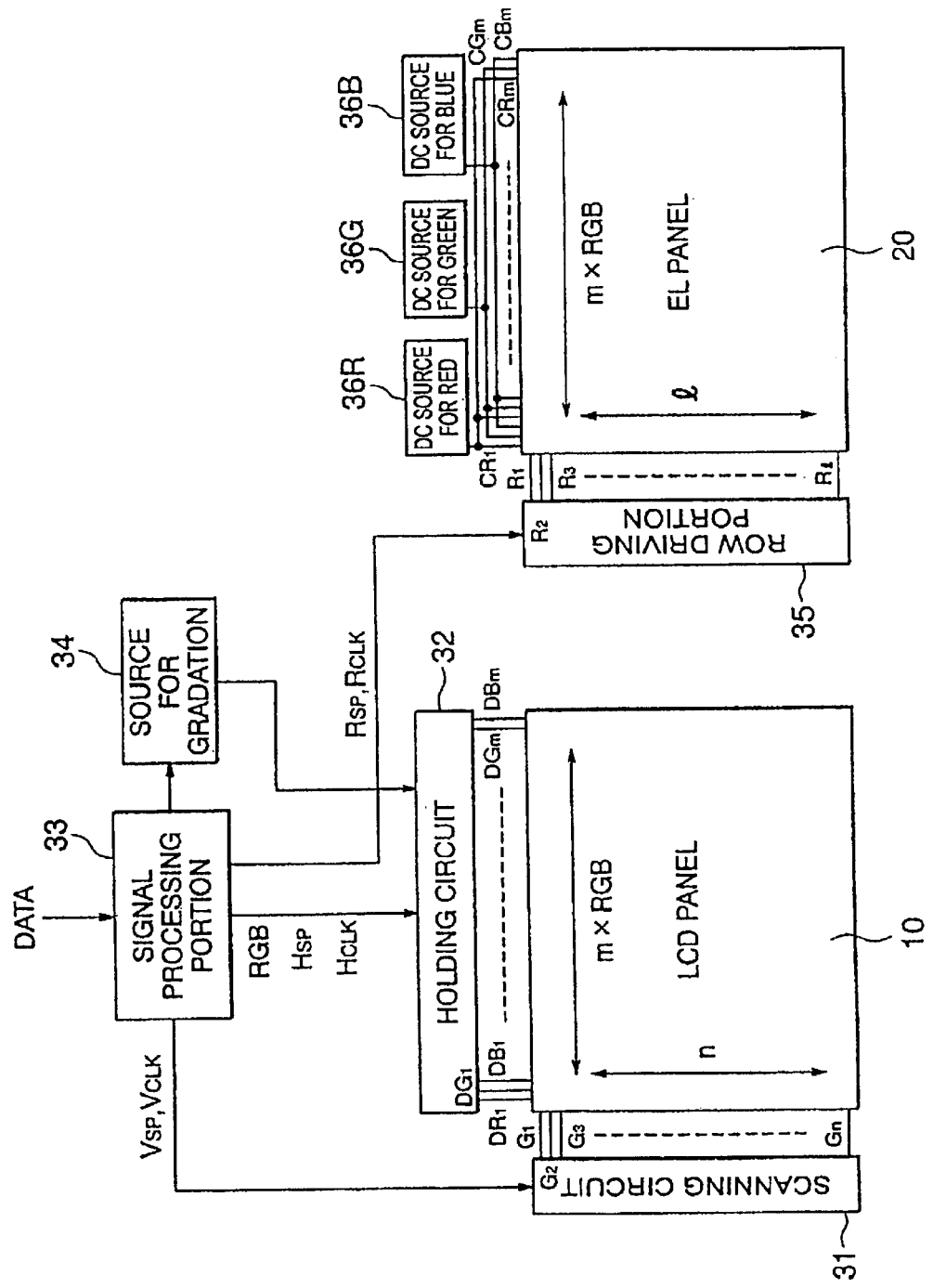
FIG. 10 is a block diagram showing a structure of the liquid crystal display utilized in the embodiment of the present invention.

Next, a structure of a driving circuit for a panel formed as described above is described. FIG. 10 is a block diagram showing a structure of a liquid crystal display utilized in the embodiment of the present invention.

The present embodiment is provided with a scanning circuit 31 for driving n scanning electrodes 2a (G1 to Gn) and a holding circuit 32 for driving (m×3) signal electrodes 2b (DR1 to DRm, DG1 to DGm and DB1 to DBm). In addition, a signal processing portion 33 which processes image data and outputs the result into the scanning circuit 31 and the holding circuit 32 is provided. Moreover, a source for gradation 34, which supplies a voltage for a gradation display to the holding circuit 32, is provided. From the signal processing part 33, the start pulse $V_{SP}$ and the clock signal $V_{CLK}$ are outputted to the scanning circuit 31, and the gradation signal RGB, the start pulse $H_{SP}$ and the clock signal $H_{CLK}$ are outputted to the holding circuit 32.

In addition, a row driving portion 35 which drives L row electrode 12 (R1 to Rl) is provided. The number L of the row electrodes 12 is determined by the width thereof and, for example, in the case where it has the width of ten pixels, it becomes one tenth of the number n of the scanning electrodes 2a. The start pulse $R_{SP}$ and the clock signal $R_{CLK}$ are outputted from the signal processing portion 33 to the row driving portion 35. In addition, a DC (direct current) source for red 36R, which supplies a constant current to m column electrodes 14 (CR1 to CRm) formed on m red light emitting EL layers 13R, a DC source for green 36G, which supplies a constant current to m column electrodes 14 (CG1 to CGm) formed on m green light emitting EL layers 13G, and a DC source for blue 36B, which supplies a constant current to m column electrodes 14 (CB1 to CBm) formed on m blue light emitting EL layers 13B are provided. A column driving portion 36 is formed of the DC source for red 36R, the DC source for green 36G, and the DC source for blue 36B.

Figure 11:
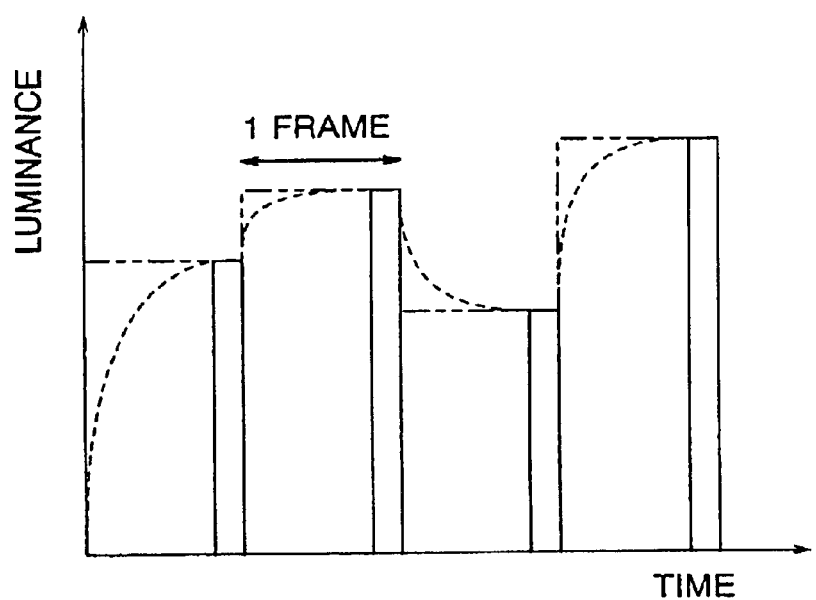
FIG. 11 is a graph diagram showing the relationship between time and luminance in the embodiment of the present invention.
Figure 12:
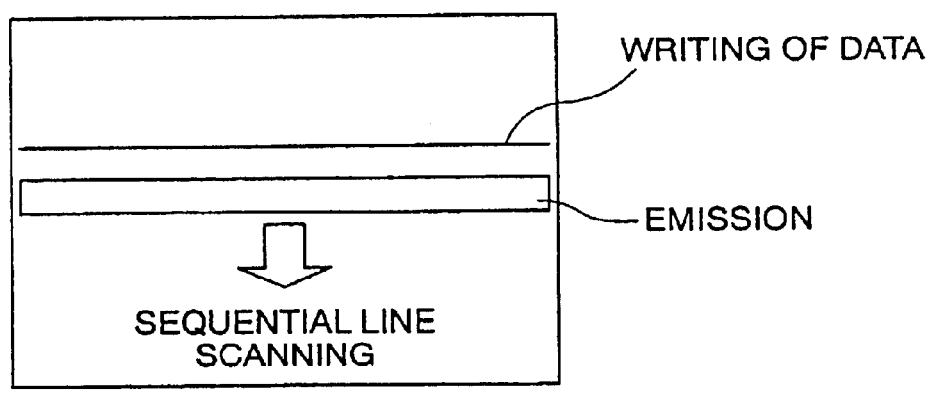
FIG. 12 is a schematic view showing the relationship between the writing position in data of the LCD panel 10 and the light emission position in the EL panel 20.

Next, a driving method, according to the present embodiment, for the liquid crystal display formed as described above is described. FIG. 11 is a graph diagram showing the relationship between time, which is taken along the horizontal axis, and luminance, which is taken along the vertical axis, in the embodiment of the present invention. FIG. 12 is a schematic diagram showing the relationship between the data writing position in the LCD panel 10 and the light emission position in the EL panel 20. In FIG. 11, the two dotted broken line shows luminance (transmitted light amount) set in the LCD panel 10 for one pixel, the dotted line shows the actual luminance (transmitted light amount) of the one pixel in the LCD panel 10, and the solid line shows luminance set in the EL panel 20 for the one pixel. Here, the writing position and the light emission position at a certain instant are shown in FIG. 12.

In the driving method for the liquid crystal display according to the present embodiment, scanning pulses are applied in sequence from the scanning electrode G1 to the scanning electrode Gn by the scanning circuit 31 with reference to the start pulse $V_{SP}$ and the clock signal $V_{CLK}$. Together with this, a voltage for gaining the luminance, which is set based on the image data by the holding circuit 32, is applied to the signal electrodes DR1 to DRm, DG1 to DGm and DB1 to DBm. That is to say, the holding circuit 32 applies a voltage for a gradation display to each signal electrode. At this time, since a response time for the sufficient rotation exists for the applied voltage in the liquid crystal, the actual luminance (transmitted light amount) shown by the dotted line cannot immediately reach the saturation value, but rather gradually changes, even when a voltage for gaining the luminance (transmitted light amount) shown by the two dotted broken line is applied to the signal electrode, as shown in FIG. 11. As described above, the response time of the TN type liquid crystal is approximately 15 milliseconds. In addition, the response time of the guest/host type liquid crystal and the polymer dispersion type liquid crystal is shorter than the above-mentioned response time and is approximately a few milliseconds. Here, during this time, the voltage applied to the liquid crystal is maintained as it is until the next voltage is applied as shown by the two dotted broken line in FIG. 11.

In addition, in the present embodiment, a light emission indication voltage is applied to a row electrode 35 by the row driving portion 35 in the EL panel 20 with reference to a signal wherein a slight delay is generated in the clock signal and the start signal immediately before the writing of the next frame is carried out in the LCD panel 10 as shown by the solid line in FIG. 11. On the other hand, in the column electrodes CR1 to CRm, CG1 to CGm and CB1 to CBm, a column voltage is applied to all of the signal electrodes DR1 to DRm, DG1 to DGm and DB1 to DBm from the column driving portion 36. Accordingly, light emission of three colors, red, green and blue, is carried out at the same time in one pixel. For example, in the case where one row electrode 12 is provided for ten scanning electrodes 2a, as shown in FIG. 12, while the scanning circuit 31 is carrying out the scan, that is to say, the writing of data, in the k-th to (k+9)-th scanning electrodes from the top, the row driving portion 35 drives one row electrode 12 which is provided corresponding to the (k+10)-th to (k+19)-th scanning electrodes G(k+10) to G(k+19). Accordingly, a display of (10× m) pixels is carried out through one time of light emission.

According to such a driving method, when a light emission is carried out in the EL panel 20, the luminance (transmitted light amount) in the liquid crystal layer 8 provided on the top surface side of this panel reaches the set value. For example, even in the case where a liquid crystal layer 8 made of the TN type liquid crystal, which has a relatively slow response rate, is provided and one row electrode 12 is provided for 10 scanning electrodes 2a, the luminance (transmitted light amount) has increased to the set value in the pixel wherein the last data writing is carried out in the previous frame. Accordingly, a display of a desired color tone and luminance can be gained at the instance when the light emission is carried out in the EL panel 20. Therefore, unclearness of the outline, the blurring of colors and the like, when displaying a moving image are prevented.

In addition, since the light emission in the EL panel 20 is the light emission of three colors at the same time for one pixel, the driving with the frequency of ⅓ or less of the period is possible in comparison with the case where light of three colors is emitted in sequence according to a conventional time-sharing system. Accordingly, it becomes possible to secure the driving margin widely and it also becomes possible to achieve cost deduction through the utilization of a simpler and inexpensive clock driver.

In addition, in the case where, by driving one row electrode 12 corresponding to a plurality of scanning electrodes 2a, the liquid crystal display becomes highly precise and the number of scanning electrodes increases, it becomes possible to sufficiently secure time to apply a light emission indication voltage to one row electrode 12, that is to say, the light emission duty. Accordingly, in such a case, it is possible to secure the desired luminance. In addition, in the case where one row electrode 12 is made to correspond to a plurality of scanning electrodes 2a, in comparison with the case of correspondence to one scanning electrode 2a, the width of the row electrodes 12 is made approximately as broad as the corresponding number of scanning electrodes 2a and, therefore, the patterning step for them becomes simplified and the yield increases. In addition, since the number of applications of a voltage to the row electrodes 12 is significantly reduced for the same number of scanning electrodes, the light emitting EL layer 13 has an increased longevity.

In addition, in comparison with a conventional panel in which a liquid crystal display panel only is built in, since the EL panel 20 carries out a light emission of three colors, the back light and the color filters become unnecessary so that it becomes possible to make the entire thickness thinner to approximately 3 to 4 mm. In addition, though, in the case where a back light is utilized, a voltage application of approximately several ten kHz, 1000 V to the back light is necessary, a DC voltage application of several tens of V's is sufficient in the case where an EL panel 20 is provided as in the present embodiment. Therefore, the blurring of the image due to the application of a voltage of a high frequency can be prevented. In addition, in comparison with the case where color filters are utilized, light is emitted outside as it is without passing through a filter and therefore, a high luminance is gained.

Figure 13:
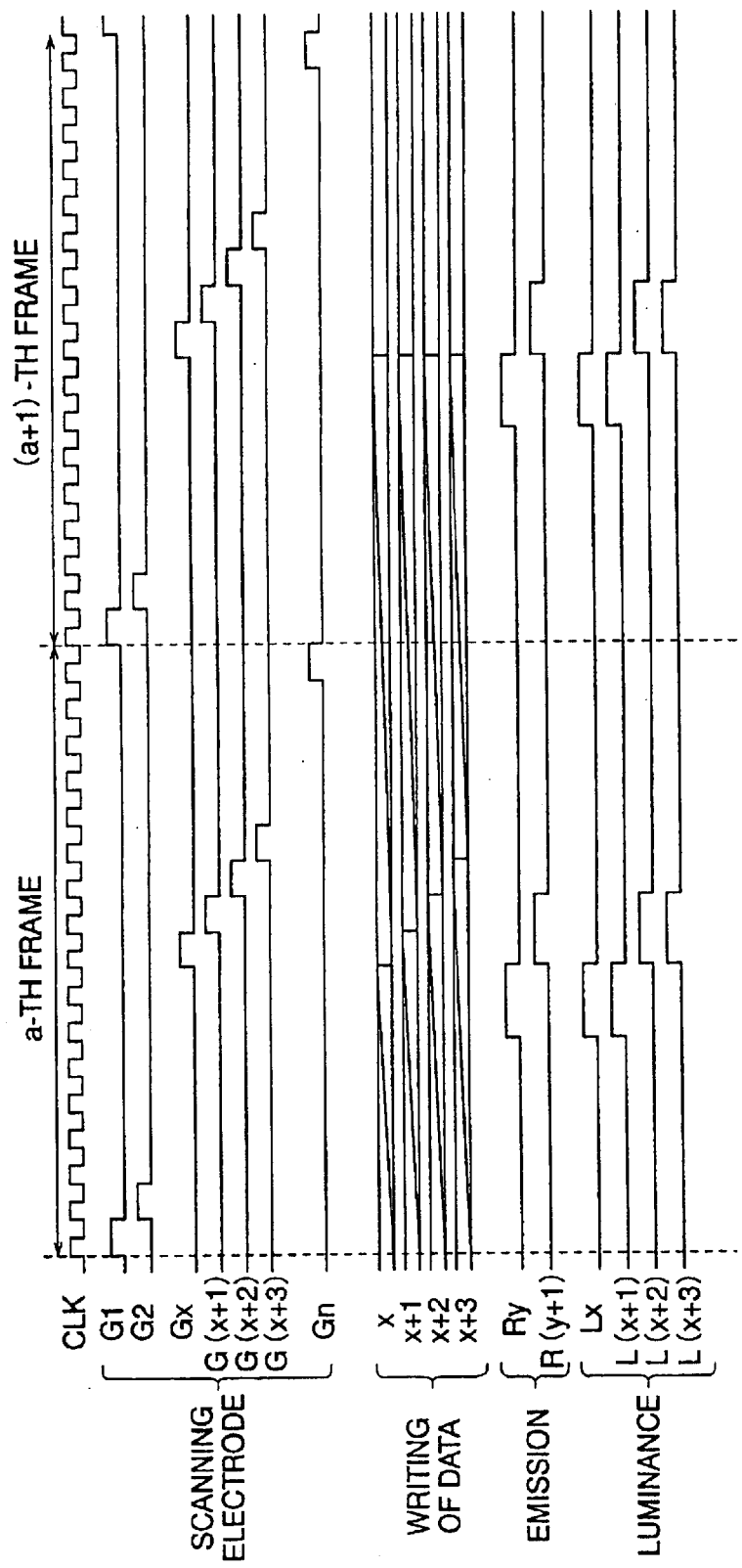

Next, the case where one row electrode is provided for two scanning electrodes is cited as an example, and the description of the waveform of the signals in the scanning electrodes and the like will be described. FIG. 13 is a timing chart showing the shift of a variety of signals or the like.

In the LCD panel, scanning pulses are applied in sequence to the scanning electrodes G1, G2, . . . , Gx to G(x+3), . . . , Gn by the scanning circuit 31 and by synchronizing them with the rises of the clock signal CLK. In addition, by applying a voltage corresponding to the image data to a predetermined signal electrode, by the holding circuit 32 and by synchronizing it with the rise of the scanning pulse in the scanning electrode Gx, data of the a-th frame are written into the x-th pixel from the top. In the same way, data of the a-th frame are also written into the (x+1)-th to (x+3)-th pixels. Here, before those pieces of data are written in, data of the (a−1)-th frame have been written into these pixels so that the liquid crystal molecules rotate in accordance with them and the liquid crystal molecules face in the direction set in the (a−1)-th frame immediately before the writing of data.

On the other hand, in the EL panel, a light emission indication voltage is applied to the row electrode Ry which is provided in correspondence with the scanning electrodes Gx and G(x+1) by the row driving portion 31 immediately before the rise of the scanning pulse in the scanning electrode Gx. According to this timing, the liquid crystal molecules face in the direction set in the (a−1)-th frame also in the (x+1)-th pixel from the top when the response rate of the liquid crystal is taken into consideration. Accordingly, in the x-th and (x+1)-th pixels from the top, displays of sufficient luminance Lx and L(x+1) are carried out. In addition, immediately before the rise of the scanning pulse in the scanning electrode G(x+2), a light emission indication voltage is applied to the row electrode R(y+1) which is provided in correspondence with the scanning electrodes G(x+2) and G(x+3) by the row driving position 31. According to this timing, the liquid crystal molecules face in the direction, which is set in the (a−1)-th frame in the (x+2)-th and (x+3)-th pixels from the top when the response rate of the liquid crystal is taken into consideration. Accordingly, in the (x+2)-th and (x+3)-th pixels from the top, displays of sufficient luminance L(x+2) and L(x+3) are carried out.

Then, such steps are carried out repeatedly in the (a+1)-th frame and in the following frames.

In the case where one row electrode corresponds to two scanning electrodes in this manner, the above-described effect can also be gained. Here, a driving method according to the present invention can be applied to a liquid crystal display wherein one scanning electrode corresponds to one row electrode. In this case, it becomes possible to allow, without fail, the EL panel to emit light in a pixel where the writing of data is completed.

Here, though in the above-described embodiment, an organic EL layer is utilized so that a direct current is supplied to this, an inorganic EL layer can be utilized and an alternating current can be supplied. In addition, though the liquid crystal display as shown in FIG. 7 is not provided with a polarizing plate, a polarizing plate may become necessary depending on the type of the liquid crystal.

In addition, though in the above described embodiment, the EL panel 20 is provided so as to make contact with the glass substrate 1 on the side of the TFT portion 2, the EL panel may be provided so as to make contact with the glass substrate 4 on the opposite side or the TFT portion 2 may be provided on the glass substrate 4 while the common electrode layer 5 may be provided on the glass substrate 1.

In addition, though in the embodiment, the light emission in the EL panel is carried out after the actual transmittance of the liquid crystal reaches the saturation value, the light emission may be carried out after, for example, the transmittance reaches a predetermined value, which is approximately 90% of the saturation value, as long as the luminance which is sufficient for human vision can be gained.

What is claimed is:

1. A driving method for a liquid crystal display which comprises an electro-luminescence portion which has electro-luminescence elements and a liquid crystal portion which has liquid crystal layer, scanning electrodes and signal electrodes and controls the transmittance of light emitted by the electro-luminescence elements, wherein said electro-luminescence portion has row electrodes which overlap said scanning electrodes, and said method comprising the steps of:

applying scanning pulses in sequence to said scanning electrodes;

applying a gradation signal associated with image data to said signal electrodes; and allowing said electro-luminescence portion to emit light of a plurality of colors at the same time in pixels after transmissivity of said liquid crystal layers in said pixels reaches a predetermined value, said pixels being located at the intersections between a scanning electrode to which said scanning pulse is applied and said signal electrodes to which said gradation signal is applied, wherein in allowing said electro-luminescence portion to emit light, said electro-luminescence portion is allowed to emit light in pixels included in neighboring rows at the same time, and in allowing said electro-luminescence portion to emit light in pixels of sequential rows at the same time, a signal which generates a voltage required to emit lights is applied to one of said row electrodes.

2. The driving method for a liquid crystal display according to claim 1, wherein the number of scanning electrodes that overlap each of said row electrodes are constant and the number of rows of pixels which are allowed light emission at the same time is constant.

3. The driving method for a liquid crystal display according to claim 1, wherein said liquid crystal is one type selected from a group consisting of a host/guest type, a twisted nematic type and a polymer dispersion type.

4. A driving method for a liquid crystal display which comprises an electro-luminescence portion which has electro-luminescence elements and a liquid crystal portion which has liquid crystal layer, scanning electrodes and signal electrodes and controls the transmittance of light emitted by the electro-luminescence elements, wherein said electro-luminescence portion comprises column electrodes for each color, said method comprising the steps of:

applying scanning pulses in sequence to said scanning electrodes;

applying a gradation signal associated with image data to said signal electrodes; and allowing said electro-luminescence portion to emit light of a plurality of colors at the same time in pixels after transmissivity of said liquid crystal layers in said pixels reaches a predetermined value, said pixels being located at the intersections between a scanning electrode to which said scanning pulse is applied and said signal electrodes to which said gradation signal is applied, wherein in allowing said electro-luminescence portion to emit light, all of column electrodes for the same color are driven at the same time, and in allowing said electro-luminescence portion to emit light, all of the column electrodes, including column electrodes for different colors, are driven at the same time.

5. The driving method for a liquid crystal display according to claim 4, wherein said liquid crystal is one type selected from a group consisting of a host/guest type, a twisted nematic type and a polymer dispersion type.

* * * * *

UNITED STATES PATENT AND TRADEMARK OFFICE
CERTIFICATE OF CORRECTION

PATENT NO. : 6,831,627 B2
DATED : December 14, 2004
INVENTOR(S) : Hasegawa et al.

It is certified that error appears in the above-identified patent and that said Letters Patent is hereby corrected as shown below:

<u>Title page,</u>
Item [56], References Cited, FOREIGN PATENT DOCUMENTS, Korean Patent No. "2000-14574" should be listed; and Korean Patent No. "1998-42103" should be listed.

Signed and Sealed this

Twenty-eighth Day of June, 2005

JON W. DUDAS
*Director of the United States Patent and Trademark Office*